(12) United States Patent
Nisper et al.

(10) Patent No.: US 7,557,925 B2
(45) Date of Patent: Jul. 7, 2009

(54) OPTICAL INSTRUMENT AND PARTS THEREOF FOR OPTIMALLY DEFINING LIGHT PATHWAYS

(75) Inventors: Jon K. Nisper, Grand Rapids, MI (US); Michael J. Mater, Chelsea, MI (US); Bernard J. Berg, Wayland, MI (US)

(73) Assignee: X-Rite, Inc., Grand Rapids, MI (US)

( * ) Notice: Subject to any disclaimer, the term of this patent is extended or adjusted under 35 U.S.C. 154(b) by 167 days.

(21) Appl. No.: 11/504,187

(22) Filed: Aug. 15, 2006

(65) Prior Publication Data
US 2007/0188764 A1 Aug. 16, 2007

Related U.S. Application Data

(60) Provisional application No. 60/710,920, filed on Aug. 24, 2005, provisional application No. 60/708,222, filed on Aug. 15, 2005.

(51) Int. Cl.
G01J 3/51 (2006.01)
(52) U.S. Cl. .................. 356/419; 356/406; 356/407; 356/446
(58) Field of Classification Search ......... 356/406–407, 356/445, 446, 419
See application file for complete search history.

(56) References Cited

U.S. PATENT DOCUMENTS

| | | | |
|---|---|---|---|
| 4,225,782 A * | 9/1980 | Kuppenheimer et al. .... | 250/216 |
| 4,558,786 A | 12/1985 | Lane | |
| 4,566,797 A | 1/1986 | Kaffka et al. | |
| 4,618,257 A | 10/1986 | Bayne et al. | |
| 4,676,653 A * | 6/1987 | Strohmeier et al. ......... | 356/446 |
| 4,707,838 A | 11/1987 | Reule et al. | |
| 4,797,609 A | 1/1989 | Yang | |
| 4,937,764 A * | 6/1990 | Komatsu et al. ............ | 356/446 |

(Continued)

FOREIGN PATENT DOCUMENTS

EP 0117606 A1 9/1984

(Continued)

OTHER PUBLICATIONS

International Search Report for PCT/US06/12416, Jan. 25, 2007 (4 pages).

(Continued)

*Primary Examiner*—F. L Evans
(74) *Attorney, Agent, or Firm*—McCarter & English, LLP

(57) ABSTRACT

An optical assembly is disclosed that includes an illumination source, a detection sensor, a monitor sensor, and an optical piece having a first side adapted to face a sample. The optical piece defines an illumination channel extending from the illumination source toward the first side, a detection channel extending from the first side toward the detection sensor, and a monitor channel extending from the illumination channel toward the monitor sensor. A spectrophotometer is also disclosed that includes a circuit board, illumination source and one or more sensors. The circuit board includes an optically transparent region, wherein the illumination source is mounted and situated relative to a first surface of the circuit board, so as to direct light through the optically transparent region. Each sensor is mounted and situated relative to a second surface of the circuit board opposite the first surface.

27 Claims, 5 Drawing Sheets

U.S. PATENT DOCUMENTS

| | | | |
|---|---|---|---|
| 5,072,128 A | 12/1991 | Hayano et al. | |
| 5,137,364 A | 8/1992 | McCarthy | |
| 5,311,293 A | 5/1994 | MacFarlane et al. | |
| 5,313,267 A | 5/1994 | MacFarlane et al. | |
| 5,471,052 A | 11/1995 | Ryczek | |
| 5,671,735 A | 9/1997 | MacFarlane et al. | |
| 5,838,451 A | 11/1998 | McCarthy | |
| 5,844,680 A | 12/1998 | Sperling | |
| 5,854,680 A | 12/1998 | Rakitsch | |
| 5,917,183 A | 6/1999 | Sperling | |
| 5,963,333 A * | 10/1999 | Walowit et al. | 356/425 |
| 6,020,583 A | 2/2000 | Walowit et al. | |
| 6,067,504 A | 5/2000 | MacFarlane et al. | |
| 6,129,664 A | 10/2000 | Macfarlane et al. | |
| 6,147,761 A | 11/2000 | Walowit et al. | |
| 6,157,445 A | 12/2000 | Macfarlane et al. | |
| 6,163,377 A * | 12/2000 | Boles et al. | 356/402 |
| 6,178,341 B1 | 1/2001 | Macfarlane et al. | |
| 6,271,920 B1 | 8/2001 | Macfarlane et al. | |
| 6,308,088 B1 | 10/2001 | MacFarlane et al. | |
| 6,314,372 B1 | 11/2001 | Macfarlane et al. | |
| 6,330,341 B1 | 12/2001 | Macfarlane et al. | |
| 6,369,895 B1 * | 4/2002 | Keeney | 356/419 |
| 6,384,918 B1 | 5/2002 | Hubble, III et al. | |
| 6,400,099 B1 | 6/2002 | Walker | |
| 6,469,785 B1 * | 10/2002 | Duveneck et al. | 356/244 |
| 6,556,932 B1 | 4/2003 | Mestha et al. | |
| 6,577,395 B1 | 6/2003 | Berns et al. | |
| 6,584,435 B2 | 6/2003 | Mestha et al. | |
| 6,587,793 B2 | 7/2003 | Viassolo et al. | |
| 6,621,576 B2 | 9/2003 | Tandon et al. | |
| 6,653,992 B1 | 11/2003 | Colbeth et al. | |
| 6,661,513 B1 | 12/2003 | Granger | |
| 6,690,471 B2 | 2/2004 | Tandon et al. | |
| 6,721,692 B2 | 4/2004 | Mestha et al. | |
| 6,732,917 B1 | 5/2004 | Benz et al. | |
| 6,760,124 B1 | 7/2004 | Boerger et al. | |
| 6,765,674 B2 | 7/2004 | Orelli et al. | |
| 6,844,931 B2 | 1/2005 | Ehbets | |
| 6,903,813 B2 | 6/2005 | Jung et al. | |
| 6,958,810 B2 | 10/2005 | Jung et al. | |
| 7,027,186 B2 | 4/2006 | Sano et al. | |
| 7,057,727 B2 | 6/2006 | Ott | |
| 7,068,263 B2 * | 6/2006 | Evanicky et al. | 345/207 |
| 7,081,955 B2 * | 7/2006 | Teichmann et al. | 356/328 |
| 7,113,281 B2 | 9/2006 | Ott | |
| 7,132,644 B2 * | 11/2006 | Grunert et al. | 250/226 |
| 7,145,657 B2 * | 12/2006 | Peterson et al. | 356/402 |
| 7,262,853 B2 * | 8/2007 | Peterson et al. | 356/402 |
| 7,380,962 B2 * | 6/2008 | Chaves et al. | 362/293 |
| 2003/0098896 A1 | 5/2003 | Berns et al. | |
| 2004/0208210 A1 | 10/2004 | Inoguchi | |
| 2005/0036163 A1 | 2/2005 | Edge | |
| 2006/0188407 A1 * | 8/2006 | Gable et al. | 422/100 |
| 2006/0197960 A1 * | 9/2006 | Bazylenko | 356/491 |
| 2006/0244806 A1 | 11/2006 | Overbeck et al. | |
| 2006/0244935 A1 | 11/2006 | Overbeck et al. | |
| 2006/0244948 A1 | 11/2006 | Overbeck | |
| 2006/0244960 A1 | 11/2006 | Overbeck et al. | |
| 2007/0035740 A1 | 2/2007 | Nisper et al. | |

FOREIGN PATENT DOCUMENTS

| | | |
|---|---|---|
| EP | 0292957 B1 | 4/1991 |
| EP | 0642012 A1 | 3/1995 |
| EP | 0871025 A1 | 10/1998 |
| EP | 0696867 B1 | 3/2000 |
| EP | 1001393 A2 | 5/2000 |
| EP | 1291628 A2 | 3/2003 |
| EP | 1293762 A2 | 3/2003 |
| EP | 1326199 A2 | 7/2003 |
| EP | 0936400 B1 | 3/2006 |
| GB | 1589335 A | 5/1981 |
| JP | 59060324 A | 4/1984 |
| JP | 2003185591 A | 7/2003 |
| WO | WO 98/11410 A1 | 3/1998 |
| WO | WO 00/16045 A1 | 3/2000 |
| WO | WO 01/016990 A1 | 3/2001 |
| WO | WO 2003/007663 A1 | 1/2003 |
| WO | WO 03/083765 A1 | 10/2003 |
| WO | WO 2004/056135 A1 | 7/2004 |
| WO | WO 2005/013365 A2 | 2/2005 |
| WO | WO 2005/050148 A2 | 6/2005 |
| WO | WO 2005/114118 A1 | 12/2005 |
| WO | WO 2006/020833 A2 | 2/2006 |
| WO | WO 2006/053808 A1 | 5/2006 |

OTHER PUBLICATIONS

International Search Report for PCT/US2006/031891, Feb. 5, 2007 (8 pages).

International Search Report for PCT/US2006/031892, Feb. 16, 2007 (8 pages).

James H. Nobbs, "Colour-Match Prediction for Pigmented Materials," from *Colour Physics for Industry*, Chapter 6, pp. 292-372, (Roderick McDonald ed., Society of Dyers and Colourists, 2d ed. 1997).

Gunter Wyszeckl & W.S. Stiles, *Color Science: Concepts and Methods, Quantitative Data and Formulae*, pp. 221-222, 785-786, (Joseph W. Goodman ed., John Wiley & Sons, Inc., 2d. ed. 1982).

Rolf G. Kuehni, Verona Division of Mobay Chemical Corp., *Computer Colorant Formulation*, Chapter 3-6. pp. 11-86, (Lexington Books 1975).

Paul Henry Hoffenberg, Automated Color-Matching of Printed Ink films (1972) (unpublished Ph.D. dissertation, Lehigh University) (on file with UMI Dissertation Information Service).

Raja Balasubramanian, *Optimization of the Spectral Neugebauer Model for Printer Characterization*, 8 Journal of electronic Imaging 156, 156-166 (1999).

Henry R. Kang, *Applications of Color Mixing Models to electronic Printing*, 3 Journal of Electronic Imaging 276, 276-87 (1994).

R.D. Hersch et al., *Spectral Prediction and Dot Surface Estimation Models for Halftone Prints*, 5293 SPIE 356, 356-69 (2004).

Safer Mourad, Color Predicting Model for Electrophotographic Prints on Common Office Paper (2003) (unpublished M.S. thesis, Swiss Federal Institute of Technology), at htt://diwww.epfl.ch/w31sp/pub/papers/colour/thesis-mourad.pdf.

* cited by examiner

OPTICAL INSTRUMENT AND PARTS THEREOF FOR OPTIMALLY DEFINING LIGHT PATHWAYS

CROSS-REFERENCE TO RELATED APPLICATION

This application claims the benefit of U.S. Provisional Application No. 60/710,920 filed on Aug. 24, 2005, and U.S. Provisional Application No. 60/708,222, filed on Aug. 15, 2005, which are incorporated herein by reference. This application is also related to a concurrently filed U.S. Patent Application entitled, "IMPROVED OPTICAL INSTRUMENT," by Jon Nisper and Mike Mater, which is herein incorporated by reference.

BACKGROUND

Spectrophotometers and other similar optical instruments have been used in industry for many years to measure optical properties of various objects. A spectrophotometer operates by illuminating a sample surface or other object and then sensing the light that is either reflected by or transmitted through the sample. The reflected or transmitted light may then be characterized by wavelength and intensity. Traditional spectrophotometers are large bench top instruments suitable for use in a lab or similar environment. As advances have been made in microelectronics, smaller, more portable spectrophotometers have been developed.

These smaller devices, however, suffer from several significant disadvantages. For example, it is difficult to find suitable illumination sources for smaller spectrophotometers. Traditional incandescent bulbs of sufficient brightness are often too big and use too much energy to be practical in smaller applications. Many portable spectrophotometers use light emitting diodes (LED's) as an illumination source, however, these devices create their own problems. First, even LED's manufactured to the highest tolerances often show an unacceptable variation in spectral output from unit to unit. Also, the spectral output of an LED tends to change with temperature, causing spectrophotometers to be temperature dependent. Additional problems arise as individual spectrophotometer components are placed in close proximity with one another. For example, when the illumination source and detection sensors are placed in close proximity, light leakage from the source is often picked up by the sensors, skewing their readings.

SUMMARY

In one general aspect, the invention is directed to an optical assembly for use with an optical instrument. The optical assembly may comprise an illumination source, a detection sensor, a monitor sensor, and an optical piece having a first side adapted to face a sample. The optical piece may define an illumination channel extending from the illumination source toward the first side. The optical piece may also define a detection channel extending from the first side toward the detection sensor. In addition, the optical piece may define a monitor channel extending from the illumination channel toward the monitor sensor. In various embodiments, the monitor sensor may be a dual beam reference sensor capable of discerning color.

In another general aspect, the invention is directed to a light emitting diode (LED) assembly for use with an optical measurement device. The LED assembly may comprise a substrate having a top surface and a bottom surface and a plurality of LED dies positioned on the substrate to emit light in a first direction normal to the bottom surface of the substrate. The LED assembly may also comprise a plurality of leads in electrical contact with the plurality of LED dies. The plurality of leads may be positioned on the bottom surface of the substrate, and may be configured to surface-mount to a board.

In yet another general aspect, the invention is directed to a spectrophotometer. The spectrophotometer may comprise a circuit board, an illumination source, and a sensor. The circuit board may comprise a first surface and a second surface opposite the first surface, and may have a first optically transparent opening between the first surface and the second surface. The illumination source may be mounted on the first surface of the circuit board, and may be mounted to direct light through the first optically transparent opening. The sensor may be mounted on the second surface of the circuit board.

BRIEF DESCRIPTION OF THE FIGURES

Embodiments of the present invention are described herein, by way of example, in conjunction with the following figures, wherein.

DETAILED DESCRIPTION OF THE INVENTION

Figure 1:
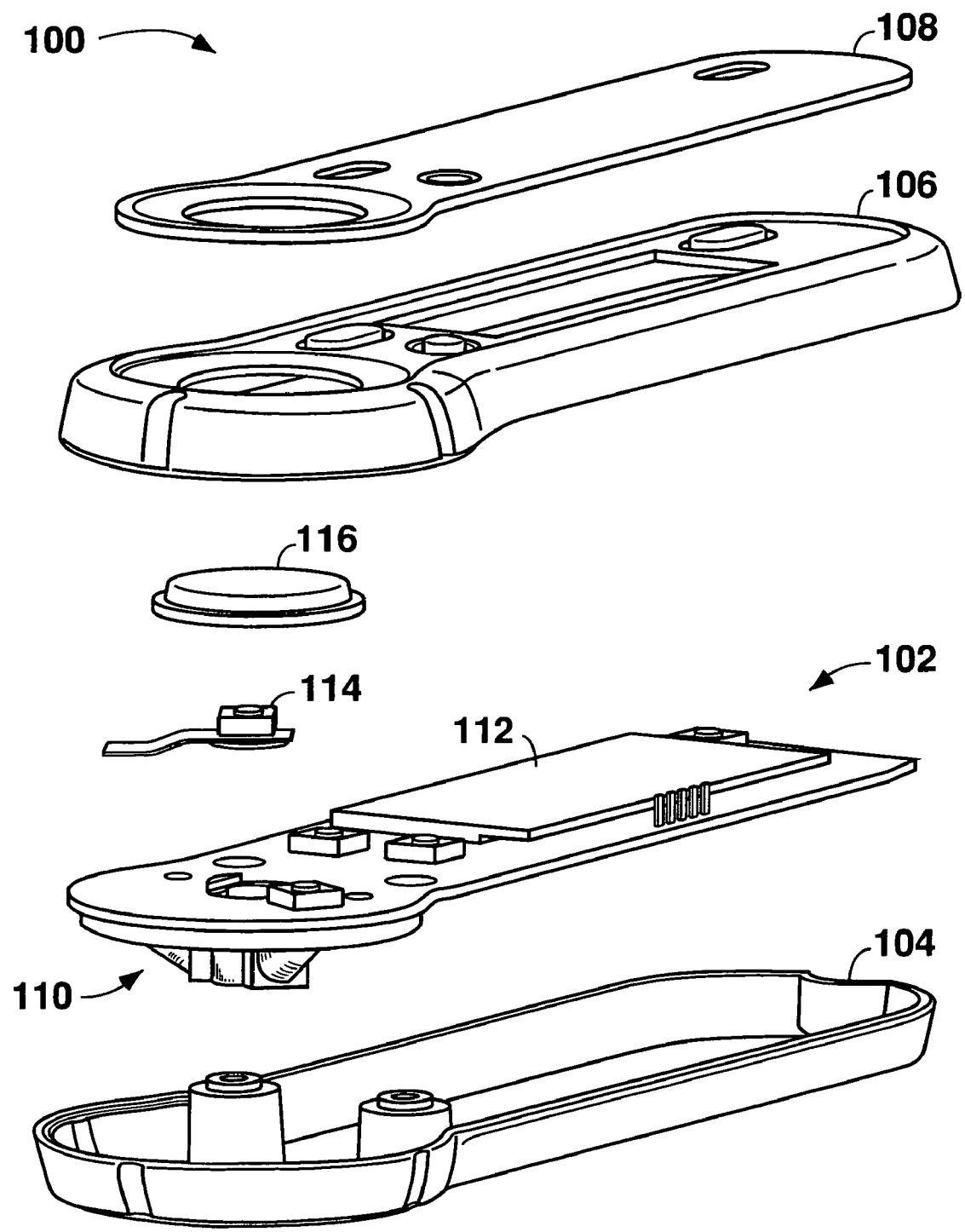
FIG. 1 shows an exploded view of a spectrophotometer according to various embodiments.

Embodiments of the present invention are directed to portable optical instruments including, for example, spectrophotometers, densitometers, sensitomers, photometers, etc., and various components thereof. FIG. 1 shows an exploded view of an exemplary instrument 100 according to various embodiments. The instrument 100 comprises a circuit board 102 and an enclosure for the circuit board that includes enclosure bottom 104, enclosure top 106 and covers 108 and 116.

Figure 2:
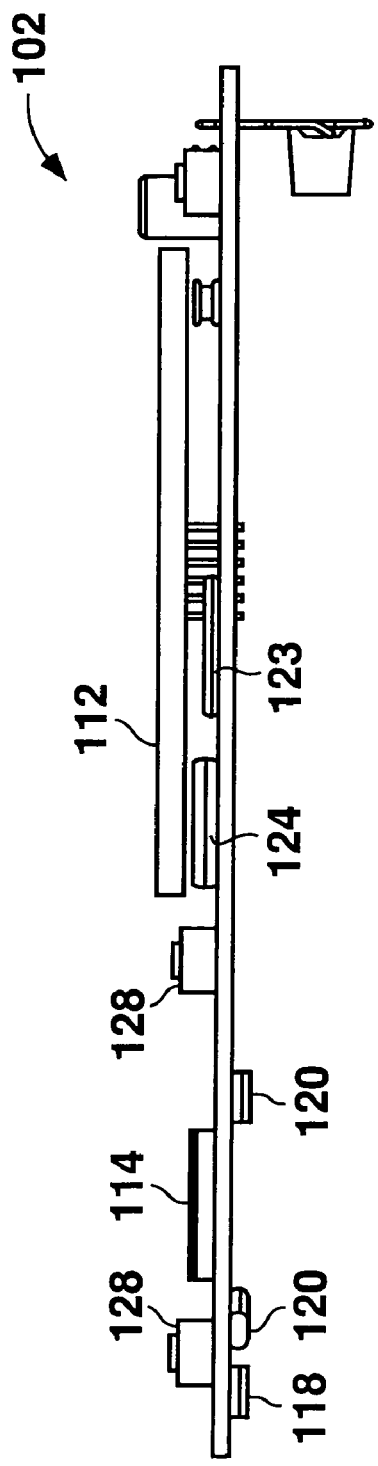
FIG. 2-3 show views of a spectrophotometer circuit board according to various embodiments.
Figure 3:
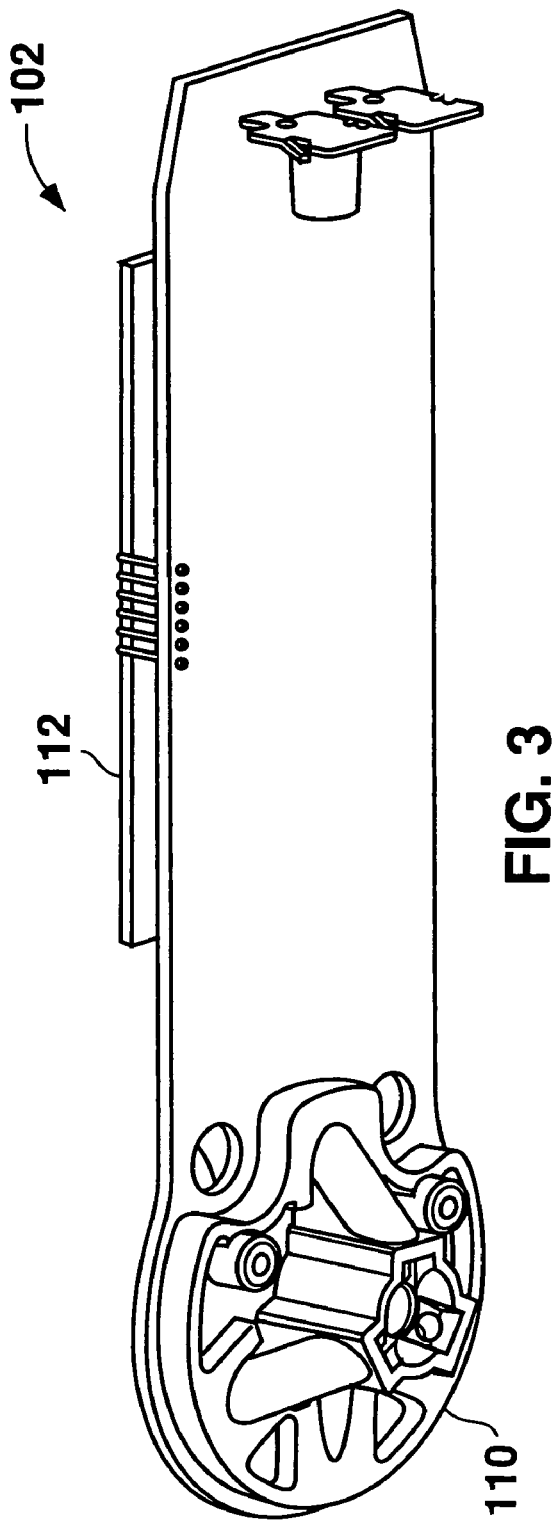

The circuit board 102, also pictured in FIGS. 2 and 3, includes various optical and electronic components necessary to implement the instrument 100. For example, the circuit board 102 may include optical components such as, for example, illumination source 114 and sensors 118, 120, as shown in FIG. 2. The illumination source 114 may be any kind of suitable illumination source and may include, for example, one or more incandescent sources, one or more fluorescent sources, one or more light emitting diodes (LED's), etc. In various embodiments, all or a portion of the optical components 114, 118, 120 may be enclosed by an optical piece 110. The optical piece may direct light emitted from or received by the various optical components, for example, as described in more detail below.

The sensors 120, 118 may be any sort of sensor or photosensitive device. Detection sensor(s) 120 may be directed to receive light reflected by or transmitted through a sample surface (e.g., by optical piece 110). Monitor sensor(s) 118 may be directed to receive and monitor light emitted by the illumination source 114 (e.g., by optical piece 110). In various embodiments, the sensors 120 and/or monitor sensors 118 may have the capability to discern color. The sensors 118, 120 may be constructed according to any suitable technology, though, in various embodiments, the sensors 118 and/or 120 may be constructed using low cost CMOS technologies. Also, in various embodiments, each individual sensor 120, 118 may be comprised of many individual sensors, for example a 16×16 array of 64 individual sensors or a 640×480 array of 307,200 sensors (e.g., such as an RGB CMOS chip similar to those used by cameras). Further, such individual sensors may have individual spectral filters located on top of them. In this way, the individual sensors sample only a portion of the spectrum reflected from an object for each LED. In various embodiments the individual sensors may be addressed individually, or sensors with similar color filters may be addressed together.

The circuit board 102 may also include other components for implementing non-optics portions of the instrument 100. For example, the circuit board 102 may include a processor 124 for configuring the optics and interpreting signals from the sensors 118, 120. A memory 123 in communication with the processor 124 may store instructions for the processor 124, results of spectrophotometer measurements, etc. The memory 123 may include any suitable kind of volatile and/or non-volatile memory device. A display 112 in communication with the processor 124 may be used to provide a user interface to a user of the instrument 100, for example, to display results of measurements, receive input parameters and other instructions for the instrument 100, etc. The user may provide input to the instrument 100 via input buttons 128. An actuation button 116, may allow a user to cause the instrument 100 to take a reading. It will be appreciated that, in various embodiments, any suitable computer or computer devices may be included on the circuit board 102 instead of, or in addition to, processor 124, memory 123, etc.

Figure 5:
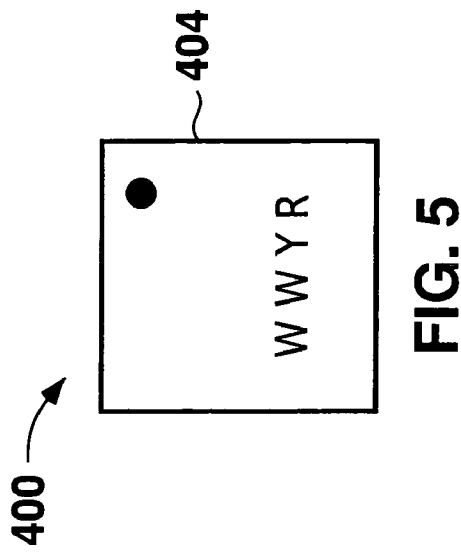
FIGS. 4-6 show views of a light emitting diode (LED) chip according to various embodiments.
Figure 6:
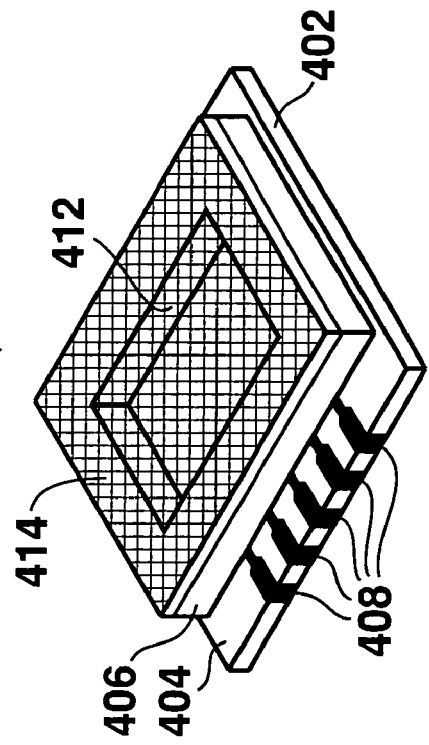
Figure 4:
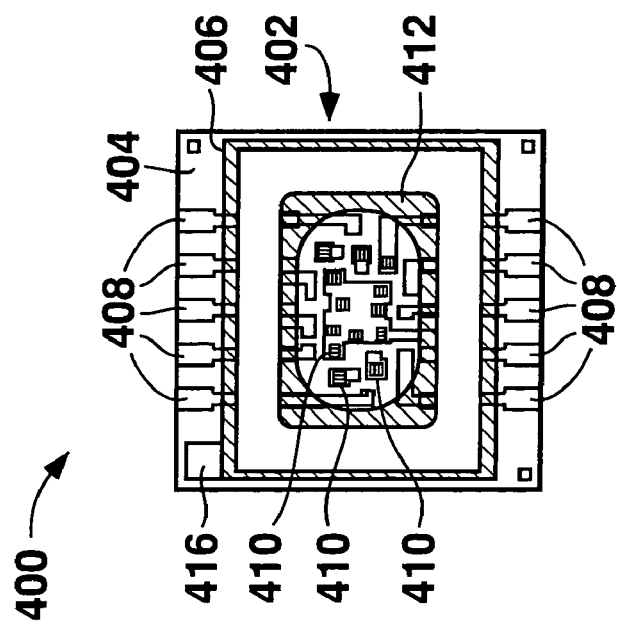
Figure 8:
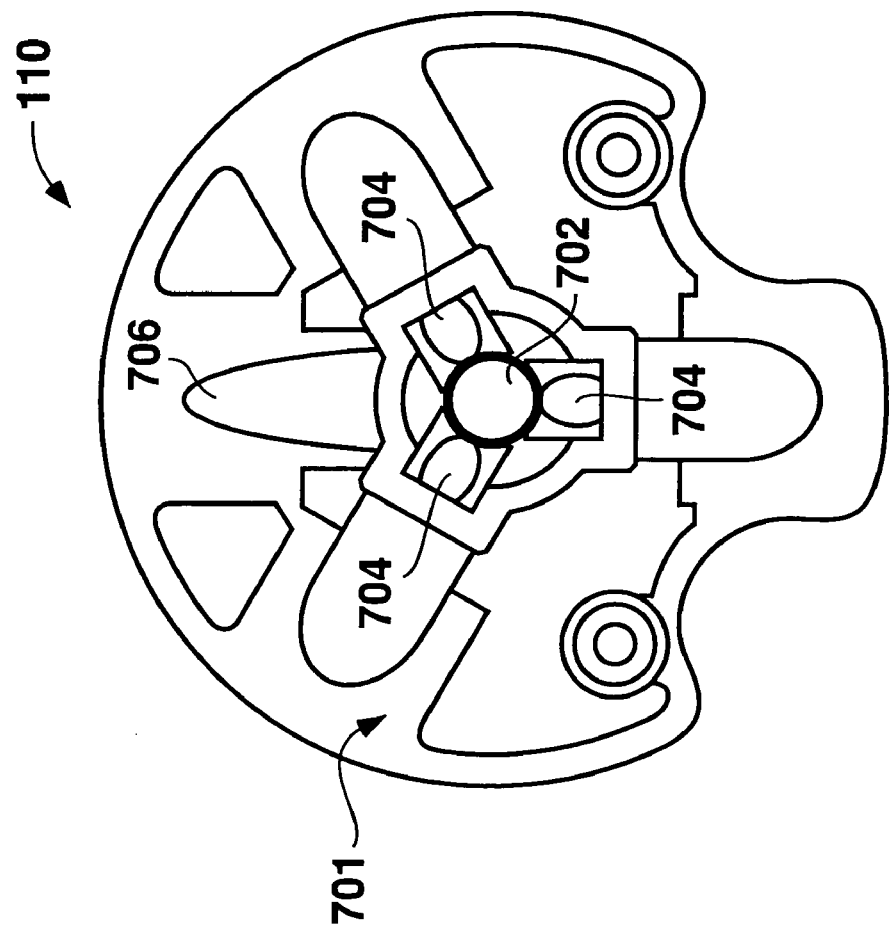
FIGS. 7-10 show views of an optical piece according to various embodiments.
Figure 7:
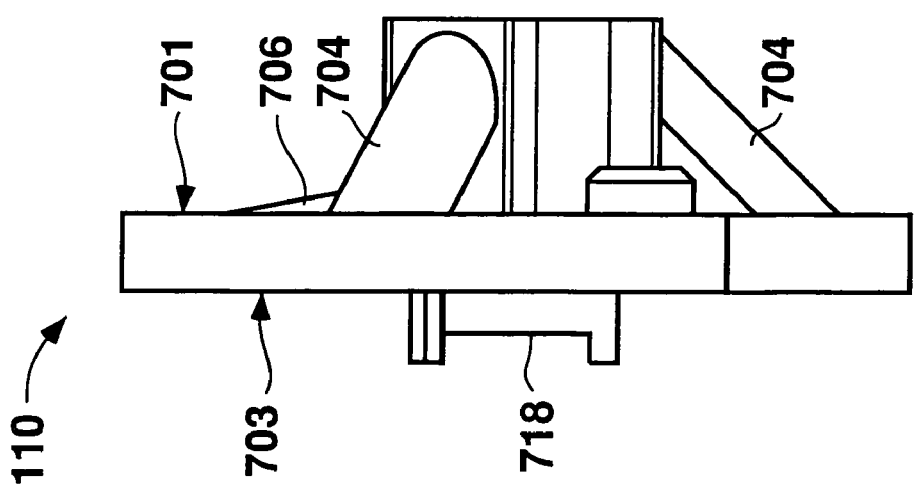

FIGS. 4-6 show detailed views, according to various embodiments, of an LED chip illumination source 400. The LED chip 400 may provide light of various different wavelengths or colors. In various embodiments, the LED chip 400 may comprise a substrate 402. The substrate 402 may be made of a ceramic or other high thermal conductivity material, and have a base portion 404 and raised portion 406. The raised portion 406 may define a cavity 412. LED dies 410 may be mounted on a surface of the substrate 402 within the cavity 412 as shown. The LED dies 410 may be electrically connected to leads 408, which may be used to provide current and voltage to the LED dies 410, causing them to emit light. In various embodiments, at least a portion of the inside edges of the cavity 412 may be constructed of a reflective material, such as, for example SPECTRALON or a suitable ceramic material. In this way, light from the LED dies 410 that is incident on the edges of the cavity 412 may be reflected away from the edges, reducing light leakage. Also, in other various embodiments, at least a portion of the inside edges of the cavity 412 may include a reflective coating, such as aluminum, gold, SPECTRAFLEC coating, etc. In various embodiments, all or a portion of the leads 408 may also serve as a reflective material.

It will be appreciated that each of the LED dies 410 may have a specific peak wavelength. The LED dies 410 may all have different peak wavelengths, or may include dies 410 with approximately the same peak wavelengths. For example, multiple dies 410 with the same or similar peak wavelengths may be used to boost the output power at a desired wavelength. The number of LED dies 410 and the number of peak wavelengths may be selected based on the specific requirements of the instrument 100. For example, in various embodiments there may be between six and sixteen dies 410 having between six and sixteen different spectral outputs. Also, it will be appreciated that various other LED components may accompany dies 410. For example, in various embodiments, LED dies 410 may be accompanied by various reflectors, lenses, covers, etc.

In various embodiments, a filter 414 may be positioned over the LED dies 410, as shown. The filter 414 may attenuate unwanted wavelengths from the output of LED dies 410. For example, some LED's have emission bands other than their advertised peak wavelength. These extra emission bands are often in the infrared portion of the spectrum, but can be in the visible or ultraviolet portions as well. Sensors 118, 120 may be sensitive to the additional emission bands, causing their readings to be skewed. Accordingly, the filter 414 may be selected to attenuate any additional output bands that may be present. For example, if additional infrared output bands are a concern, the filter 414 may be chosen to attenuate radiation in the infrared portion of the spectrum. Also, in various embodiments, the filter 414 may be used to at least partially compensate for output variations between LED dies 410 due to production, temperature, etc. For example, the filter 414 may be a comb filter that attenuates light at multiple wavelengths and passes the advertised peak wavelengths of the LED dies 410. The comb filter may be manufactured according to any suitable method including, for example, a Fabry-Perot method.

In use, the LED chip 400 may be mounted over a hole, or other transparent area of the circuit board 102 allowing the LED chip 400 to direct illumination through the circuit board 102. For example, the raised portion 406 of the substrate 402 may fit through a hole in the circuit board 102. In various embodiments, the LED chip 400 may be mounted on a first side of the circuit board 102, and sensors 118, 120 may be mounted on a second side of the circuit board, opposite the first side. It will be appreciated that mounting the LED chip 400 and sensors 118, 120 on opposite sides of the circuit board 102 may reduce unwanted noise due to light leakage. The LED chip 400 may be secured and electrically connected to the circuit board 102 via leads 408, which may be surface mounted to corresponding pads (not shown) on circuit board 102.

The LED chip 400 may also include various other features to ease production. For example, in various embodiments, the substrate 402 and filter 412 may be made of heat resistant material (e.g., the substrate 402 may be made of ceramic and the filter 412 may be made of glass). Accordingly, the LED chip 400 may be mounted to the circuit board 102 according to known infrared (IR) solder reflow processes without damage to the chip 400. Also, in various embodiments, the LED chip 400 may include one or more orientation-specific features, such as feature 416. These orientation-specific features may mesh with corresponding features (not shown) on circuit board 102 only when the LED chip 400 is in a correct orientation relative to the circuit board 102. In this way, the correct orientation of the LED chip 400 may be verified during production.

FIGS. 7-10 show views, according to various embodiments, of the optical piece 110. The optical piece 110 may define a series of channels for directing light to and from the illumination source 114 (e.g., LED chip 400) and the respective sensors 118, 120. For example, an illumination channel 702 may direct light from the illumination source 114 to a sample (not shown). Detection channels 704 may direct reflected light from the sample to detection sensors 120. A monitor channel 706 may direct light from the illumination channel 702 to one or more monitor sensors 118. The optical piece 110 may have a first surface 701 configured to be brought into optical contact with a sample, and a second surface 703 configured to be optically coupled to the illumination source 114 and respective sensors 118, 120.

Figure 10:
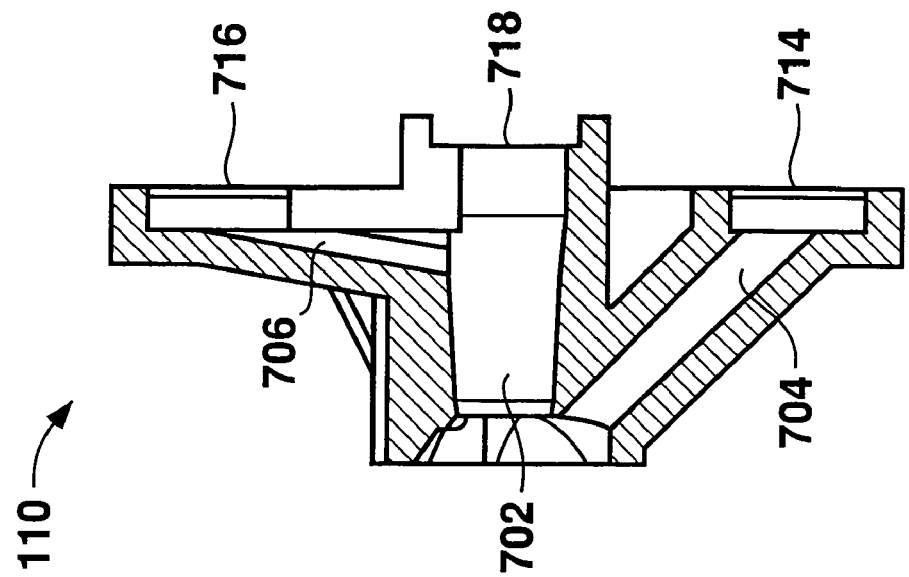
Figure 9:
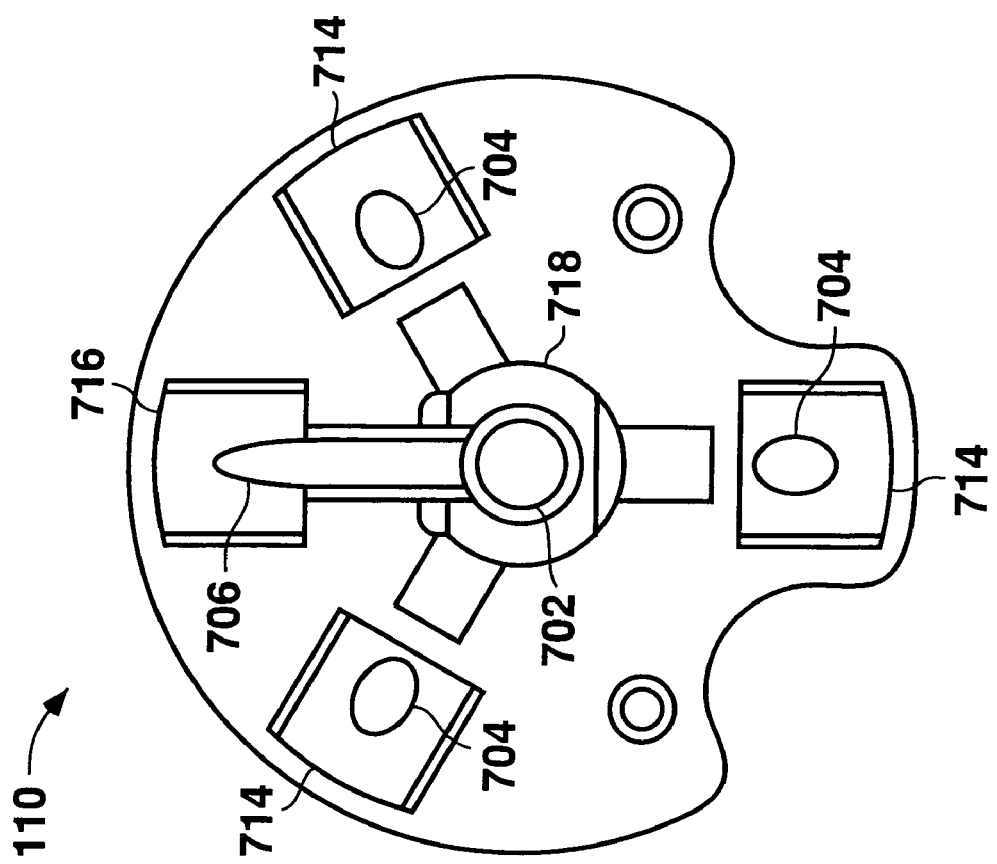

FIG. 9 shows a view of the surface 703 of the optical piece 110, according to various embodiments. The surface 703 may define various features 714, 716, 718 that facilitate coupling of the various channels 702, 704, 706 to the various optical components 114, 118, 120. In various embodiments, as shown by FIG. 10, the features 714, 716 and 718 may be indentations extending from the surface 703 to the respective channels 702, 704, 706. For example, indentations 714 are shown extending from the surface 703 to detection channels 704. In use, the detection sensors 120 may fit within indentations 714. In this way, noise due to light leakage may be further minimized. Likewise, indentation 716 may extend from the surface 703 to the monitor channel 706, allowing monitor sensor 118 to be received within the indentation 716 and thereby coupled to the monitor channel 706. Feature 718 may also be configured to receive illumination source 714 and couple it to the illumination channel 702.

In various embodiments, the channels 702, 704, 706 may be configured to enhance the optical properties of the instrument 100. For example, inside surfaces of the channels 702, 704, 706 may be polished or may include a reflective coating to enhance their reflectivity. Also, the shapes of the channels 702, 704, 706 may be selected based on the channels' purpose. For example, illumination channel 702 may be elliptical or hyperbolic. In this way light from the illumination source 114 may be efficiently collected and provided to the sample at surface 701 with improved spatial uniformity across wavelengths and LED outputs. The illumination channel 702 may also be formed into other shapes (e.g., more complex shapes) to facilitate even illumination. For example, in various embodiments, the illumination channel 702 may be fashioned in a shape that is not a surface of revolution. Also, in various embodiments, the illumination channel may be formed with ribs or facets running longitudinally from the illumination source 114.

Also, for example, the detection channels 704 may be shaped as a partial cone or cylinder. Accordingly, light received by the detection channels 704 from surface 702 of the piece 110 may be focused toward the detection sensors 120 received within features 714. Monitor channel 706 may be shaped so as to sample light emitted from the illumination source 114 and deliver it to the monitor sensor 118 such that the signal is proportional to the detector channel signals. This may be accomplished through optical design which balances the amount of light received by the monitor sensor 118 from each individual LED and ensures that it changes over temperature in a fashion similar to the detector channels. The monitor channel 706 may also be shaped to ensure that LED's included in the illumination source are sampled proportionally, regardless of their distance from the monitor sensor 118. In various embodiments, the monitor channel 706 may also be configured such that its response either does not change with temperature, or does change with temperature, but in a predictable way.

The optical piece 110 may also have various other features that facilitate easy manufacturing. For example, in various embodiments, the optical piece 110 may be constructed of one contiguous piece. In various other embodiments, the optical piece 110 may be constructed of three or fewer pieces. The pieces may be fit together according to any suitable method, for example, the pieces may snap together without the use of separate fasteners. In various embodiments, the number of pieces of the optical piece 110 may be less than the total number of channels included therein. The piece or pieces of the optical piece 110 may be constructed according to any suitable manufacturing method including, for example, injection molding.

In various embodiments, the monitor sensor 118 may be able to discern colors. Accordingly, the sensor 118 and channel 706 may be referred to as dual beam reference sensor 118 and channel 706 respectively. A dual beam reference sensor 118 may allow the spectral output of the illumination source 114 to be monitored. In various embodiments, readings of the instrument 100 may be corrected for variations in the spectral output of the illumination source. Also, it will be appreciated that when a dual beam reference sensor 118 is used, the dual beam reference channel 706 may be configured considering additional considerations. For example, the channel 706 may be achromatic, meaning that its response should not change with wavelength. In this way, light of different colors emitted by the illumination source 114 may be directed to the sensor 118 at an intensity proportional to the emission intensity. Also, in various embodiments the response of the channel 706 may change with wavelength, but in a predictable way.

It is to be understood that the figures and descriptions of the present invention have been simplified to illustrate elements that are relevant for a clear understanding of the present invention, while eliminating, for purposes of clarity, other elements, such as, for example, some specific tasks of the non-execution service provider units described above, etc. Those of ordinary skill in the art will recognize that these and other elements may be desirable. However, because such elements are well known in the art and because they do not facilitate a better understanding of the present invention, a discussion of such elements is not provided herein.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

We claim:

1. An optical assembly for use with an optical instrument, the optical assembly comprising:

an illumination source for illuminating a sample;

a detection sensor for receiving and detecting light reflected by or transmitted through the sample;

a monitor sensor for receiving and monitoring light from the illumination source; and an optical piece having a first side adapted to face the sample, the optical piece defining:
- an illumination channel extending from the illumination source toward the first side;
- a detection channel extending from the first side toward the detection sensor; and
- a monitor channel extending from the illumination channel toward the monitor sensor;

wherein the monitor channel extends from the illumination channel so as to not define a direct optical path between the illumination source and the monitor sensor.

2. The optical assembly of claim 1, wherein the illumination channel is elliptical.

3. The optical assembly of claim 1, wherein the illumination channel is hyperbolic.

4. The optical assembly of claim 1, wherein the illumination channel is not a surface of revolution.

5. The optical assembly of claim 1, wherein the illumination channel is faceted.

6. The optical assembly of claim 1, wherein the detection channel is shaped as a partial cone.

7. The optical assembly of claim 1, wherein the detection channel is shaped as a cylinder.

8. The optical assembly of claim 1, wherein the illumination source comprises a plurality of light emitting diodes (LED's), and wherein each of the plurality of LED's emits light of a different wavelength.

9. The optical assembly of claim 1, further comprising a second detection sensor, and wherein the optical piece defines a second detection channel.

10. The optical assembly of claim 1, wherein an interior portion of the illumination channel is polished.

11. The optical assembly of claim 1, wherein the optical piece is injection-molded.

12. The optical assembly of claim 1, wherein the optical piece further defines a first feature adapted to at least partially receive the illumination source.

13. The optical assembly of claim 12, wherein the optical piece further defines a second feature adapted to at least partially receive the detection sensor.

14. The optical assembly of claim 1, wherein the optical piece consists of a single piece.

15. The optical assembly of claim 1, wherein the optical piece consists of a number of pieces and the number of pieces is less than the number of optical channels defined by the optical piece.

16. The optical assembly of claim 1, wherein the monitor sensor is a dual beam reference sensor capable of discerning color.

17. The optical assembly of claim 1, wherein the illumination source comprises a plurality of spectral output bands and wherein the detection sensor is capable of discerning color.

18. The optical assembly of claim 1, wherein the illumination source and illumination channel are configured such that the illumination source is positioned directly over the sample.

19. The optical assembly of claim 9, wherein each of the detection channels receives light reflected from a different area of the sample.

20. The optical assembly of claim 1, wherein the monitor channel is configured such that a signal obtained from the monitor sensor is proportional to a signal obtained from the detection sensor.

21. A spectrophotometer comprising:
- a circuit board comprising a first surface and a second surface opposite the first surface, the circuit board having a first optically transparent area between the first surface and the second surface;
- an illumination source mounted and situated relative to the first surface of the circuit board, wherein the illumination source is mounted to direct light through the first optically transparent area; and
- a plurality of sensors, each of said plurality of sensors mounted and situated relative to the second surface of the circuit board.

22. The spectrophotometer of claim 21, further comprising a processor mounted on the circuit board.

23. The spectrophotometer of claim 22, further comprising a display device mounted on the circuit board, the display device configured to show results of the spectrophotometer.

24. The spectrophotometer of claim 23, further comprising an input device mounted on the circuit board, the input device configured to provide input to the spectrophotometer.

25. The spectrophotometer of claim 21, wherein the plurality of sensors includes at least one detection sensor, the detection sensor comprising a plurality of individual sensors and a plurality of spectral filters.

26. The spectrophotometer of claim 21, wherein the plurality of sensors includes at least one detection sensor, the detection sensor comprising an ROB CMOS chip.

27. The spectrophotometer of claim 21, wherein the optically transparent area is one of: (i) an opening defined through the circuit board and (ii) a transparent region of the circuit board.

* * * * *